Patented Feb. 12, 1935

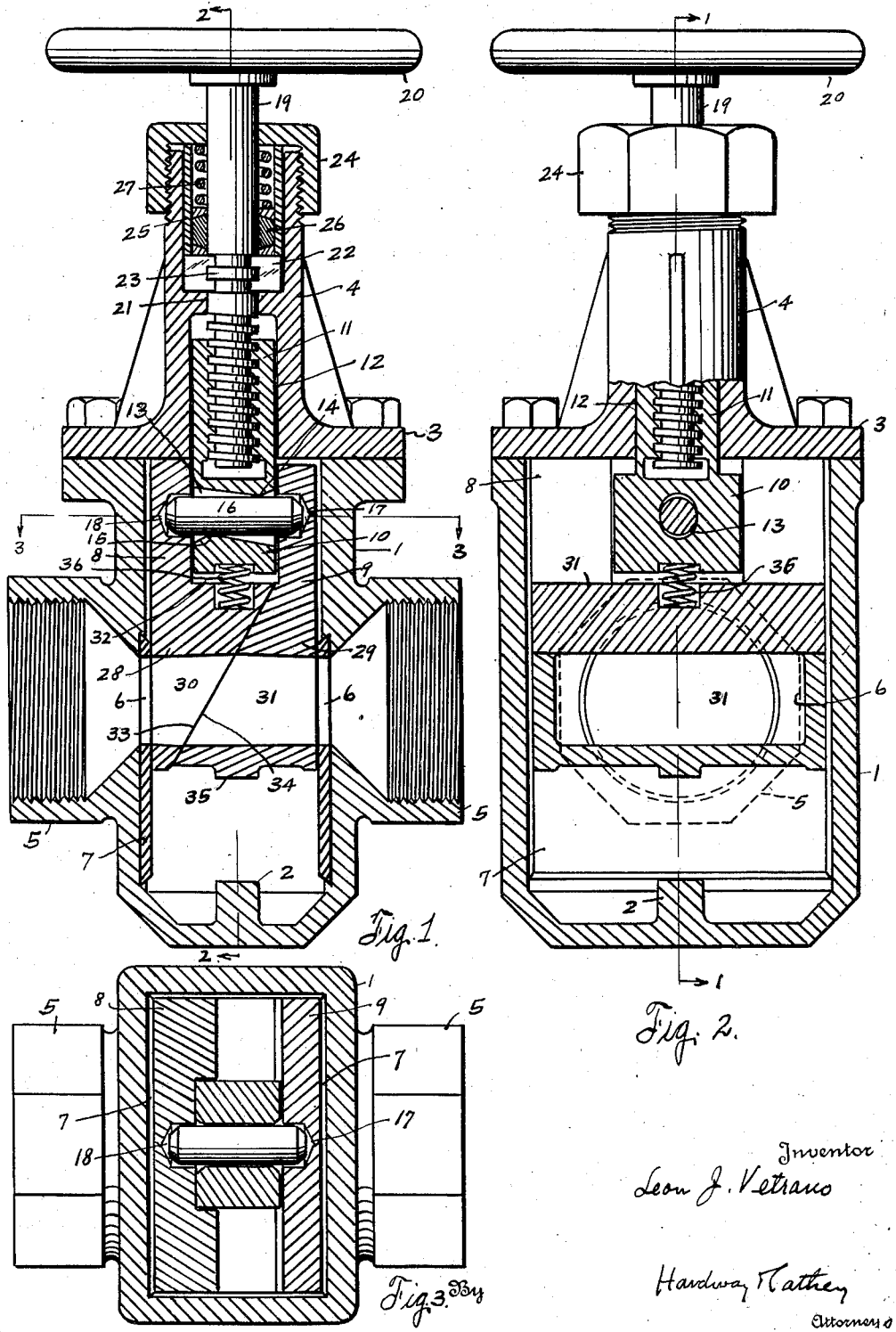

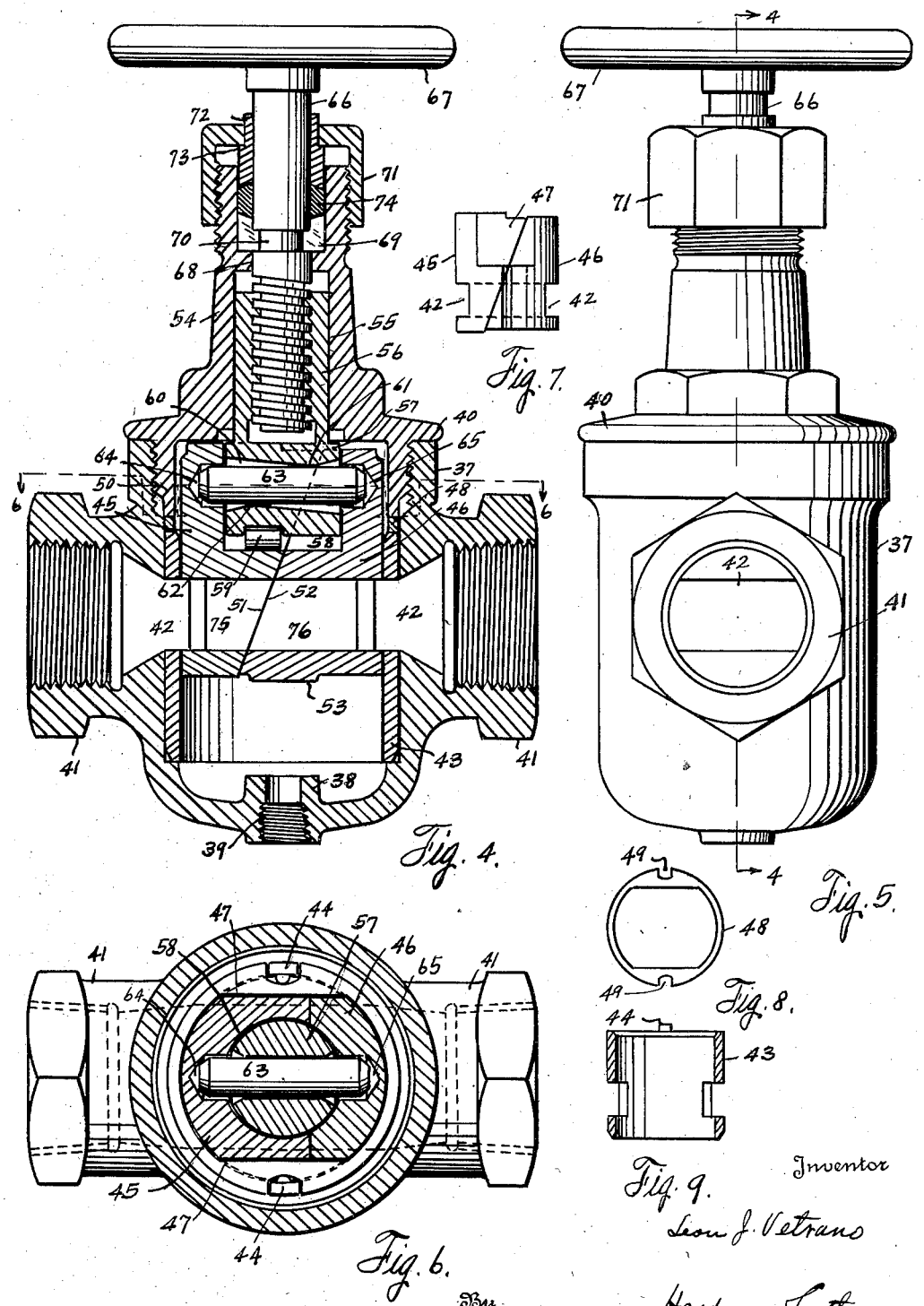

1,990,762

UNITED STATES PATENT OFFICE 1,990,762

VALVE MECHANISM

Leon J. Vetrano, Houston, Tex.

Application January 16, 1933, Serial No. 651,985

7 Claims. (Cl. 251—68)

This invention relates to valve mechanism.

An object of the invention is to provide a valve mechanism comprising a casing adapted to be connected into a flow line or other conduit, and having a controlling assembly therein movable into one position to close the flow line or conduit and also movable into another position to open the flow line and to provide a continuous conduit through the casing.

Another object is to provide, in a valve mechanism, a controlling assembly whose parts are at all times maintained in close fitting relation with each other and with the casing to prevent the escape of fluid and of foreign objects, from the conduit into the valve casing.

Another object of the invention is to provide in a valve of the character described a controlling assembly composed of cooperating parts having coacting tapering faces and novel means for actuating said parts into position to either close or open the flow line to which the valve casing is connected.

With the above and other objects in view the invention has particular relation to certain novel features of construction, operation and arrangement of parts, an example of which is given in this specification and illustrated in the accompanying drawings, wherein:

Figure 1 shows a longitudinal sectional view taken on the line 1—1 of Figure 2.

Figure 2 shows a longitudinal sectional view taken on the line 2—2 of Figure 1.

Figure 3 shows a cross sectional view taken on the line 3—3 of Figure 1.

Figure 4 shows a longitudinal sectional view of a modified type of the valve taken on the line 4—4 of Figure 5.

Figure 5 shows a side elevation.

Figure 6 shows a cross sectional view taken on the line 6—6 of Figure 4.

Figure 7 shows a side view of the controlling assembly employed.

Figure 8 shows a plan view of a lock ring employed, and

Figure 9 shows a vertical sectional view of a liner sleeve employed.

In the drawings the numeral 1 designates a valve casing which is closed at one end and provided with an inwardly extending central stop 2 at said closed end. The other end of the casing is closed by a removable end plate 3 which is bolted thereto and formed integrally with said end plate there is an outwardly extending bonnet 4.

The casing 1 is preferably rectangular in cross sectional contour.

On opposite sides of the casing is formed suitable pipe connections 5, 5 whereby the casing may be connected into a line. The connections 5 are tubular but the inner ends of the passageways therethrough terminate in the rectangular openings 6, 6 through the sides of the casing 1, said openings having approximately the same cross sectional area as that of the flow line into which the valve is connected. Within the casing 1 there are opposite liner plates 7 of suitable soft metal through which the openings 6 pass. These plates may be formed of Babbitt metal and may be molded in place.

Within the casing 1 there is a controlling assembly which includes the valves 8, 9. These valves are spaced apart and slidably mounted between them there is a valve actuator which includes the head 10 and the reduced shank 11, said shank being extended up into the bearing 12 of the bonnet 4. This shank and its bearing are preferably rectangular in cross sectional contour the former fitting closely within the latter. The head 10 has a transverse bearing 13 therethrough which is widened at its ends and formed with the fulcrums 14, 15 on opposite sides of the axis of the head and fitted through said bearing 13 there is a fulcrum pin 16 whose ends project out into the sockets 17, 18 in the inner sides of the valves.

The shank 11 is tubular and formed with internal threads and there is a valve stem 19 whose inner end is threaded into shank 11. The outer end of the valve stem has the hand wheel 20 secured thereto. This stem 19 works closely in a bearing 21 in the bonnet 4 and located within said bonnet outside of said bearing there is a split nut 22 having an inside groove in which the rib 23 on said stem rides. A cap 24 is screwed onto the outer end of the bonnet 4, and has a central bearing through which the stem 19 works and within the bonnet there is a sleeve 25 fitted closely between the cap 24 and the nut 22. Within the sleeve 25 there is a stuffing box 26 which surrounds the valve stem and which is maintained in assembled relation about said stem by means of a coil spring 27 which surrounds the stem 19 and is confined between the cap 24 and the stuffing box 26.

The valves 8, 9, are extended and formed into conduit members 28, 29. These conduit members have the registering conduits 30, 31 therethrough which have approximately the same cross sectional area as that of the openings 6. This controlling assembly works closely within the liner 7. The conduit member 28 is thickened inwardly forming the abrupt inside shoulder 32 and also has the tapering face 33 from said shoulder to the free end of said member. The conduit member 29 has a corresponding face 34 which works closely against the face 33, and also has the stop 35 arranged opposite the stop 2. Between the head 10 and the opposing bearing of the conduit member there is a strong coil spring 36 which is effective, at all times, to hold the faces 33, 34 in close contact and to thus maintain the controlling assembly normally expanded into close contact with the opposite sides of the liner 7.

As shown in Figures 1 and 2 the flow line is open through the valve casing 1 through which the fluid may flow but by reason of a close contact between the faces 33, 34 and between the opposite sides of the controlling assembly and the liner 7 around the openings 6 the fluid which flows through the conduit and the foreign matter therein will be prevented from entering the valve casing. If it be now desired to close the flow line the stem 19 may be turned to the right which will operate to move the head 10 inwardly. The fulcrum point 14 will bear against the cross pin 16 near one end thereof and this last mentioned end of said pin will operate the valve member 9 slightly ahead of the valve member 8 so as to release the wedging effect between the faces 33, 34, and as the stem 19 is further rotated the assembly will be moved along through the casing until the stop 35 contacts with the stop 2. At this time the valves 8, 9 will be in position to close the valve openings 6 and a further actuation of the stem 19 will operate through the cross pin 16 to further move the valve member 8 until the sloping face 33 is seated against the sloping face 34 which will cause a spreading of the valves 8, 9 until they seat closely against the liner 7 around the openings 6 thus completely closing the flow line. If it be now desired to open the valve the rotation of the stem 19 may be reversed causing an outward movement of the head 10 whereupon the fulcrum 15 operating against the pin 16 will cause the latter to move the valve member 8 outwardly ahead of the valve member 9 to release the wedging effect between these valve members and the entire controlling assembly may then move outwardly until the conduits 30, 31 through the conduit members 28, 29 are brought into alignment with the flowway. The outer end of the valve 8 will abut the end plate 3 when its flowway 30 is in alignment with the corresponding opening 6 and a further rotation of the stem 19 will carry the head 10 further outwardly actuating the cross pin 16 to carry the valve 9 out further causing a wedging effect between the sloping faces 33, 34 thus operating to spread the conduit members and to cause them to seat closely against opposite sides of the liner 7 around the openings 6.

As the valves are moved to closed position the sleeve 25 will sustain the end thrust of the valve stem 19 and will thus protect the packing of the stuffing box 26.

In the form shown in Figures 4 to 6 the casing 37 is cylindrical in form and is closed at one end and provided with the inwardly projecting stop 38, at the closed end having an internally threaded drain outlet 39 which is normally closed by a suitable plug. The other end of the casing is closed by a cap plate 40 which is screwed into said end of the casing.

On opposite sides this casing is formed with suitable pipe connections 41, 41 whereby the casing may be connected into a flow line. The connections 41 are tubular but the inner ends of the passageways therethrough terminate in rectangular openings as 42, 42 through the sides of the casing 37, said openings having approximately the same cross sectional area as that of the line into which the casing is connected. Driven into the casing there is a liner 43 preferably of bronze or similar material through which the openings 42 pass. The inner end of this liner has the oppositely disposed upstanding lugs 44, 44.

In this form the controlling assembly is formed of two sections 45, 46 and is approximately cylindrical in form to fit closely within the liner 43. At its outer end the controlling assembly has the oppositely disposed flat faces 47, 47 and surrounding the controlling assembly there is a ring 48 which is shaped to conform to the contour of and which fits closely around the outer end of said assembly and has the oppositely disposed notches 49 to receive the lugs 44, whereby the controlling assembly is prevented from turning in the casing. The end plate 40 has the reduced sleeve like extension 50 which is screwed into the casing 37 and abuts said locking rig and securely locks the same in place.

As hereinabove stated the controlling assembly is formed of two sections, having the close fitting diagonal faces 51, 52 and the section 46, has a stop 53 arranged opposite the stop 38.

On the end plate 40 there is a bonnet 54 having the axial bearing 55. Within this bearing there is fitted the tubular shank 56 whose inner end extends into the casing 37 and is formed with an enlarged cylindrical head 57 which fits snugly in a cylindrical bore 58 in the controlling assembly. Between the head 57 and the bottom of the bore 58 there is a flat U-shaped spring 59, which is effective at all times to hold the faces 51, 52 in close contact and to thus maintain the controlling assembly normally expanded in close contact with opposite sides of the liner 53.

The head 57 has a transverse bearing 60 therethrough which is widened at its ends and formed with the fulcrums 61, 62 on opposite sides of the axis of the head and fitted through said bearing 60 there is a fulcrum pin 63 whose ends project out into said sockets 64, 65 in the inner sides of the sections 45, 46.

There is a valve stem 66 whose inner end is threaded into the shank 56 and whose outer end has a hand wheel 67 secured thereto. This stem 66 works closely in the bearing 68 in the outer end of the bonnet 54 and located within this bonnet outside of said bearing there is a split nut 69 which projects into an annular groove 70 in said stem 66. A cap 71 is threaded onto the outer end of the bonnet 54 and has a central bearing through which the bushing 72 is fitted, said bushing closely surrounding the stem 66. This bushing has an external annular shoulder 73 which abuts the outer end of the cap 71 and a packing 74 surrounds said stem and is clamped between the split nut 69 and the bushing 72.

The valve sections 45, 46 are extended and formed with the registering conduits 75, 76 therethrough, which have approximately the same cross sectional area as that of the openings 42.

As shown in Figure 4 the flow line is open through the valve casing 37 through which the fluid may flow but by reason of the close contact between the faces 51, 52 and between the opposite sides of the controlling assembly and liner 43 around the openings 42 the fluid which flows through the conduct and the foreign matter therein will be prevented from entering the valve casing.

If it be now desired to close the flow line the stem 66 may be turned to the right which will operate to move the head 57 inwardly. The fulcrum point 61 will bear against the cross pin 63 near one end thereof and this last mentioned end of said pin will operate the valve section 46 slightly ahead of the section 45 so as to release the wedging effect between the faces 51, 52 and as the stem 66 is further rotated the controlling assembly will be moved along the casing until the stop 53 contacts with the stop 38. At this time the valve sections 45, 46 will be in position to close the openings 42 and a further actuation of the stem 66 will operate through the cross pin 63 to further move the valve section 45 until the sloping face 51 is seated against the sloping face 52 causing the spreading of the assembly and seating the valve sections closely against the liner 43 around the openings 42 thus completely closing the flow line. If it be now desired to open the valve the rotation of the stem 66 may be reversed causing an outward movement of the head 57 whereupon the fulcrum 62 operating against the pin 63 will cause the latter to move the valve section 45 outwardly ahead of the section 46 to release the wedging effect between the sections of the assembly and the entire controlling assembly may then move outwardly until the conduits 75, 76 will be brought into alignment with the flowway. The outer end of the section 45 is extended beyond the outer end of the section 46 as shown in Figure 7 and this extended end will abut the end plate 40 when the flowway 75 is in alignment with a corresponding opening 42 and a further rotation of the stem 66 will carry the head 57 outwardly actuating the cross bar 63 to carry the valve section 46 out further causing a wedging effect between the sloping faces 51, 52 thus operating to spread the controlling assembly and causing the sections thereof to seat closely against opposite sides of the liner 43 around the openings 42.

The drawings and description disclose what is now considered to be a preferred form of the invention by way of illustration only, while the broad principle of the invention will be defined by the appended claims.

What I claim is:

1. A valve mechanism comprising a casing having openings therein, a controlling assembly formed of cooperating valve members having a conduit therethrough and having cooperating tapering faces, means for moving said assembly into one position to align said conduit with said openings and into another position to move said conduit out of such alignment, said moving means including an actuating member arranged between the valve members and having a transverse bearing therethrough, provided with offset fulcrums, said valve members having sockets aligned with said bearing and a pin fitted through said bearing and operable by said fulcrums and whose ends project into the respective sockets.

2. A valve mechanism comprising a casing having openings therein, a controlling assembly in the casing formed of cooperating valve members, and having a conduit therethrough, said assembly having cooperating tapering faces, means for moving said assembly into one position to align said conduit with said openings and into another position to align the valves with said openings to close said openings, said moving means including an actuating member between the valve members having a transverse bearing therethrough, a fulcrum pin through said bearing whose ends are in engagement with the respective valve members, said actuating member being formed with fulcrums on opposite sides of the axis of the moving means, said fulcrums being operative against said fulcrum pin.

3. A valve mechanism comprising a casing having openings therein, a controlling assembly in the casing formed of cooperating valve members, and having a conduit therethrough, said assembly having cooperating tapering faces, means for moving said assembly into one position to align said conduit with said openings and into another position to align the valves with said openings to close said openings, said moving means including an actuating member between the valve members having a transverse bearing therethrough, a fulcrum pin through said bearing whose ends are in engagement with the respective valve members, said actuating member being formed with fulcrums on opposite sides of the axis of the moving means, said fulcrums being operative against said fulcrum pin, and a yieldable member between said actuating member and one of the valve members.

4. A valve mechanism comprising a valve casing having openings therein, a controlling assembly formed with valves and having a conduit therethrough, said valves having tapering contacting faces, a bonnet on the casing having an axial bearing, a shank movable in said bearing and having an extended end between the valves, a valve stem having a swiveling connection with the bonnet and a threaded connection with said shank, a cross pin through said extended end of said shank and whose ends engage said valves and offset fulcrums on the shank engageable with the pin on opposite sides of the axis of the shank.

5. A valve mechanism comprising a valve casing having openings therein, a controlling assembly formed with valves and having a conduit therethrough, said valves having tapering contacting faces, a bonnet on the casing having an axial bearing, a shank movable in said bearing and having an extended end between the valves, a valve stem having a swiveling connection with the bonnet and a threaded connection with said shank, a cross pin through said extended end of said shank and whose ends engage said valves and a yieldable member between the extended end of the shank and one of said valves.

6. A valve mechanism comprising a casing having openings, a controlling assembly in the casing formed with opposing valves having sloping contacting faces, said assembly having a conduit therethrough, an actuating member between the valves having a transverse bearing therethrough provided with offset fulcrums, a cross pin through said bearing and between the fulcrums and whose ends are in engagement with the valves, means for moving said actuating member to move the controlling assembly into one position to align said conduit with said openings and into another position to align the valves with said openings.

7. A valve mechanism comprising a casing having openings, a controlling assembly in the casing formed with opposing valves having sloping contacting faces, said assembly having a conduit therethrough, an actuating member between the valves having a transverse bearing therethrough provided with offset fulcrums, a cross pin through said bearing and between the fulcrums and whose ends are in engagement with the valves, means for moving said actuating member to move the controlling assembly into one position to align said conduit with said openings and into another position to align the valves with said openings, and a yieldable member between said actuating member and one of the valves and constantly tending to hold said faces in contact and to expand the assembly into close contact with the casing around said openings.

LEON J. VETRANO.